United States Patent [19]

Baas

[11] 4,251,054
[45] Feb. 17, 1981

[54] VALVE

[75] Inventor: Hendrik B. Baas, Halsteren, Netherlands

[73] Assignee: B.V. Machinefabriek en IJzergieterij*, Bergen op Zoom, Netherlands

[21] Appl. No.: 46,486

[22] Filed: Jun. 7, 1979

[30] Foreign Application Priority Data

Jun. 19, 1978 [NL] Netherlands ............... 7806614

[51] Int. Cl.³ .................. F16K 3/00; B65D 45/32
[52] U.S. Cl. ............................ 251/367; 220/319; 251/329
[58] Field of Search ............... 220/319; 251/367, 329

[56] References Cited

U.S. PATENT DOCUMENTS

| 1,207,937 | 12/1916 | Kruse | 220/319 |
|---|---|---|---|
| 1,303,175 | 5/1919 | Draper | 220/319 |
| 1,615,442 | 1/1927 | Davies | 220/319 |
| 2,287,992 | 6/1942 | Grove | 251/367 |
| 3,110,471 | 12/1963 | Kuhles | 251/367 |
| 3,185,178 | 5/1965 | Bonnard | 251/367 |
| 3,744,754 | 7/1973 | Demri | 251/367 |

FOREIGN PATENT DOCUMENTS 1434285  5/1976  United Kingdom ............ 251/367

Primary Examiner—Martin P. Schwadron
Assistant Examiner—A. Michael Chambers
Attorney, Agent, or Firm—Diller, Ramik & Wight

[57] ABSTRACT

In order to reduce corrosion problems which may be experienced with valves having flange couplings between the housing parts, the present invention provides a valve in which the cover 2 has a part 12 which fits into a corresponding part 11 of the housing 1 and is held therein by an annular spring 15. A sealing ring 17 seals the cover to the housing. Preferably the interlocking parts of the housing and the cover are oval in section to prevent relative rotation of the parts. The avoidance of protruding sharp edges facilitates the provision of a uniform overall protective layer of, for example, tar.

4 Claims, 1 Drawing Figure

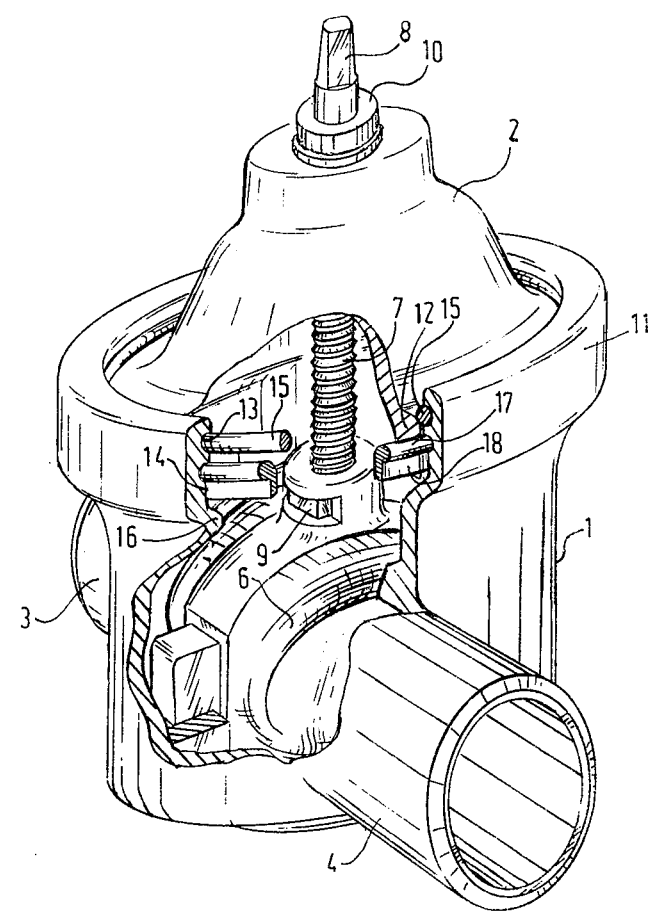

VALVE

This invention relates to a valve comprising a housing provided with connecting stubs and containing means provided with an actuator to open and close the passage of the valve, the housing being closed by means of a cover through which the actuator extends outwards.

In the known constructions of such valves, the housing and the cover are interconnected by means of flanges, sealing being obtained by a resilient packing situated between the flanges. Under certain conditions, and more particularly when a valve of this kind is disposed in the ground, problems may occur because if the soil is very corrosive the conventional methods of preserving the metal of the valve do not provide a satisfactory solution.

If, for example, the valve is protected by a layer of tar, the layer can disappear locally due to melting if the valve is subjected to high temperature during transportation or storage.

Another problem may be that the valve has a configuration such that there are sharp edges so that the layer of protective material is too thin at the edges as a result of surface tension. In addition, damage may readily occur at the sharp edges, and such edges are also most exposed to corrosion. In the case of flange connections, the bolt-holes and the screwthreads of the bolts are practically impossible to protect.

It is an object of the invention to provide a valve which is easier to protect.

According to the invention, in such a valve the cover is connected to the housing by a sleeve connection with a sealing ring, and the cover and the housing are interlocked with respect to each other by means of an annular spring disposed in a groove.

In a construction of this kind, there are no flanges for interconnecting the cover and the housing, and hence there are no bolts and bolt holes, as are required in the case of flanges. The parts to be interconnected need have no sharp edges which might give rise to difficulties in connection with protection, and the annular spring used is preferably of a stainless material.

In an advantageous embodiment, the adjacent parts of the housing and the cover have an oval cross-section, in which case no separate means is required to prevent the housing and cover from rotating relative to each other.

On the cover side the housing preferably has a reception portion with two grooves and a widened portion adjacent the inner groove, and the cover has a part which can be pushed into the reception portion and has an edge portion which engages beneath the annular spring situated in the outer groove, and the inner groove contains a ring with an apron of elastic material which cooperates in a sealing relationship with the cover and the housing. The sleeve connection is in this case constructed in a similar manner to asbestos-cement pipes, for example. The elastic ring with the apron seals off under the influence of the pressure inside the housing.

Advantageously, all of the corners of the housing and the cover are rounded off, including those which are not used for fixing the cover and the housing.

With the construction described, the housing can be formed by a casting made without mechanical after-treatment. It will be apparent that a housing of this kind can be produced cheaply and quickly.

An embodiment of the invention will now be described, by way of example, with reference to the accompanying drawing, which is a partly broken-away pictorial view of a valve, shown in a partly-open condition.

Referring to the drawing, a valve comprises a housing 1 with a cover 2 thereon. The housing 1 is provided with connecting stubs 3 and 4. A gate 6 is arranged to move up and down in a guide 5 inside the housing to close off the passage through the valve. The gate 6 can be moved up and down by means of a screw spindle 7 which can be turned by means of a square section 8 projecting outside the cover 2 with a wheel (not shown) or the like fixed thereon. The screw spindle 7 cooperates with a nut 9 which is fixed in the gate 6 so as to be secured against rotation. The spindle is taken out through the cover 2 in sealing relationship via a packing gland 10.

The casing has a reception portion 11 of oval cross-section. The cover has a correspondingly-shaped part 12 fitting in the reception part 11. The latter has two grooves 13 and 14, a stainless steel annular ring 15 being disposed in the groove 13. An edge portion of the part 12 engages behind the annular spring 15 so that the cover 2 is secured in the housing 1. Because of the oval shape, the cover is secured against rotation with respect to the housing. Beneath the groove 14 is a slightly widened portion 16, a ring of elastic material 17 with an apron 18 being situated in the groove 14. The apron 18 seals off against the inner edge of the part 11 and the outer edge of the part 12 of the cover.

With the construction described, no flanges are required, so that the bolts and bolt-holes associated with a flange connection are eliminated. The edges of the parts used can all be well rounded to reduce the problems with protecting the valve against corrosion. A corrosion-resistant layer adheres satisfactorily throughout and the absence of sharp edges means that there are no parts where the surface tension would make the layer too thin to give good protecion.

I claim:
1. A valve comprising, in combination:
   a housing defining a hollow body having two connecting stubs projecting therefrom and normally communicating through the interior of said body, said stubs adapted to be connected to respective conduits of a liquid flow system, and said body including retention means for retaining valve means which can control said communication between said stubs;
   valve means retained by said retention means and including a rotatable actuator rod whereby the valve means may be actuated;
   said body having a reception portion defining a sleeve recess opening into the interior of said body to allow assembly of said valve means thereinto and said actuator rod extending substantially axially through said sleeve recess, said reception portion presenting an inwardly facing wall surface surrounding said actuator rod and having an inner groove and an outer groove, each groove being continuous and contained in a respective plane normal to the axis of said rod;
   a generally bell shaped cover including a packing gland at its apex through which said rotatable actuator rod extends in sealing relation, said cover having an outwardly flaring rim received in said recess and of such dimensions as to establish a slide fit in said sleeve recess between said grooves;

a resilient lock ring received in said outer groove and overlying said outwardly flaring rim of the cover whereby to lock said cover within said recess;

said cover having a lower portion projecting from said rim to present an outer wall surface lying in spaced relation to said wall surface of the body and overlapping said inner groove; and a sealing ring having a bead received in said inner groove and an apron extending away from said rim, said sealing ring being sandwiched between said wall surface of the body and said outer wall surface of the cover so as to produce a seal therebetween.

2. A valve as defined in claim 1 wherein said recess and said outer wall surface of the cover are of oval cross section.

3. A valve as defined in claim 1 or 2, wherein all of the corners of the housing and cover are rounded.

4. A valve according to claim 1, wherein the housing is formed by a casting made without mechanical after-treatment.

* * * * *

UNITED STATES PATENT AND TRADEMARK OFFICE
CERTIFICATE OF CORRECTION

PATENT NO. : 4,251,054
DATED : February 17, 1981
INVENTOR(S) : Hendrik Baas

It is certified that error appears in the above-identified patent and that said Letters Patent are hereby corrected as shown below:

---[73] Assignee

B.V.Machinefabriek en IJzergieterij "Holland-Bergen op Zoom"

Bergen op Zoom, the Netherlands---.

Signed and Sealed this

Twelfth Day of May 1981

[SEAL]

Attest:

RENE D. TEGTMEYER

*Attesting Officer*    *Acting Commissioner of Patents and Trademarks*